United States Patent
Kinoshita et al.

(10) Patent No.: US 9,958,861 B2
(45) Date of Patent: May 1, 2018

(54) PRODUCTION CONTROL SYSTEM AND INTEGRATED PRODUCTION CONTROL SYSTEM

(71) Applicant: FANUC CORPORATION, Yamanashi (JP)

(72) Inventors: Jiro Kinoshita, Yamanashi (JP); Yasushi Nomoto, Yamanashi (JP); Tomoki Oya, Yamanashi (JP); Teruki Nakasato, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days. days.

(21) Appl. No.: 15/422,697

(22) Filed: Feb. 2, 2017

(65) Prior Publication Data

US 2017/0227950 A1 Aug. 10, 2017

(30) Foreign Application Priority Data

Feb. 9, 2016 (JP) ................................. 2016-022598

(51) Int. Cl.
*G06F 19/00* (2018.01)
*G05B 19/418* (2006.01)
(Continued)

(52) U.S. Cl.
CPC ... *G05B 19/41865* (2013.01); *G05B 13/0265* (2013.01); *G06Q 10/063118* (2013.01);
(Continued)

(58) Field of Classification Search
CPC .......... G05B 19/41865; G05B 13/0265; G05B 2219/32283; G05B 2219/31263; G06Q 10/063118; Y02P 90/82
See application file for complete search history.

(56) References Cited

U.S. PATENT DOCUMENTS 6,353,814 B1 * 3/2002 Weng ................. G05B 13/0265
700/258
9,849,364 B2 * 12/2017 Tran ....................... A63B 69/36
(Continued)

FOREIGN PATENT DOCUMENTS

CN 101881944 A 11/2010
CN 102226563 A 10/2011
(Continued)

OTHER PUBLICATIONS

Ao, Chaohua, and Jianchao Bi. "Parameter auto-tuning method based on selflearning algorithm." Journal of Computers 7.9 (2012): 2168-2175.*

*Primary Examiner* — Michael D Masinick
(74) *Attorney, Agent, or Firm* — Hauptman Ham, LLP

(57) ABSTRACT

Provided is a production control system of a factory including: a plurality of machines; an air conditioner; a power computation unit for monitoring power consumption of an entire factory; a temperature information generation unit for generating information on temperature inside the factory; wherein running status and processing condition of the machines and running status of the air conditioner are controlled to produce the products dictated by the production plan by a delivery deadline; and a machine learning unit that learns a relationship of operational status including the running status and the processing condition of the machines and the running status of the air conditioner to environmental status including production completion time according to the operational status, the temperature inside the factory, and the power consumption of the factory, and outputs operational status that brings the environmental status to a desired condition in accordance with the production plan.

8 Claims, 7 Drawing Sheets

(51) Int. Cl.
*G05B 13/02* (2006.01)
*G06Q 10/06* (2012.01)

(52) U.S. Cl.
CPC .............. *G05B 2219/31263* (2013.01); *G05B 2219/32283* (2013.01); *Y02P 90/82* (2015.11)

(56) References Cited

U.S. PATENT DOCUMENTS

| | | | | |
|---|---|---|---|---|
| 9,851,728 B2* | 12/2017 | Matsuoka | .......... | G05D 23/1919 |
| 2002/0002414 A1* | 1/2002 | Hsiung | ................ | G05B 15/02 |
| | | | | 700/95 |
| 2013/0173064 A1* | 7/2013 | Fadell | ................ | G05D 23/1902 |
| | | | | 700/276 |
| 2014/0005837 A1* | 1/2014 | Fadell | ................ | F24F 11/0009 |
| | | | | 700/276 |
| 2014/0052300 A1* | 2/2014 | Matsuoka | ............ | F24F 11/0086 |
| | | | | 700/276 |
| 2016/0040603 A1* | 2/2016 | Dull | ................... | G05B 13/0265 |
| | | | | 700/49 |
| 2017/0227950 A1* | 8/2017 | Kinoshita | .......... | G05B 13/0265 |

FOREIGN PATENT DOCUMENTS

| | | | | |
|---|---|---|---|---|
| JP | 5-165839 A | 7/1993 | | |
| JP | 2004-94900 A | 3/2004 | | |
| JP | 2004-151830 A | 5/2004 | | |
| JP | 2011-156598 A | 8/2011 | | |
| JP | 2013-210728 A | 10/2013 | | |
| JP | 2013-228922 A | 11/2013 | | |
| JP | 2014-228972 A | 12/2014 | | |
| JP | 5818865 B2 | 11/2015 | | |
| JP | 2017070105 A * | 4/2017 | ......... | G05B 13/0265 |
| WO | 2014/065111 A1 | 5/2014 | | |

* cited by examiner

FIG. 6A

PRODUCTION PLAN

| PRODUCT | QUANTITY | REQUIRED PROCESS | DELIVERY DEADLINE |
|---|---|---|---|
| X | $n_X$ PIECE(S) | MACHINE A: $t_{AX}(P_A(t))$ HOUR(S)/PIECE<br>MACHINE B: $t_{BX}(P_B(t))$ HOUR(S)/PIECE<br>⋮<br>MACHINE N: $t_{NX}(P_N(t))$ HOUR(S)/PIECE | $t_X$ HOUR(S) |

FIG. 6B

WORKING SCHEDULE

| MACHINE | OPERABLE/INOPERABLE |
|---|---|
| A | $e_A(t)$ |
| B | $e_B(t)$ |
| ⋮ | ⋮ |
| N | $e_N(t)$ |

HEREIN, $e_K(t) = 0, 1$ (K=A, B, ⋯, N).

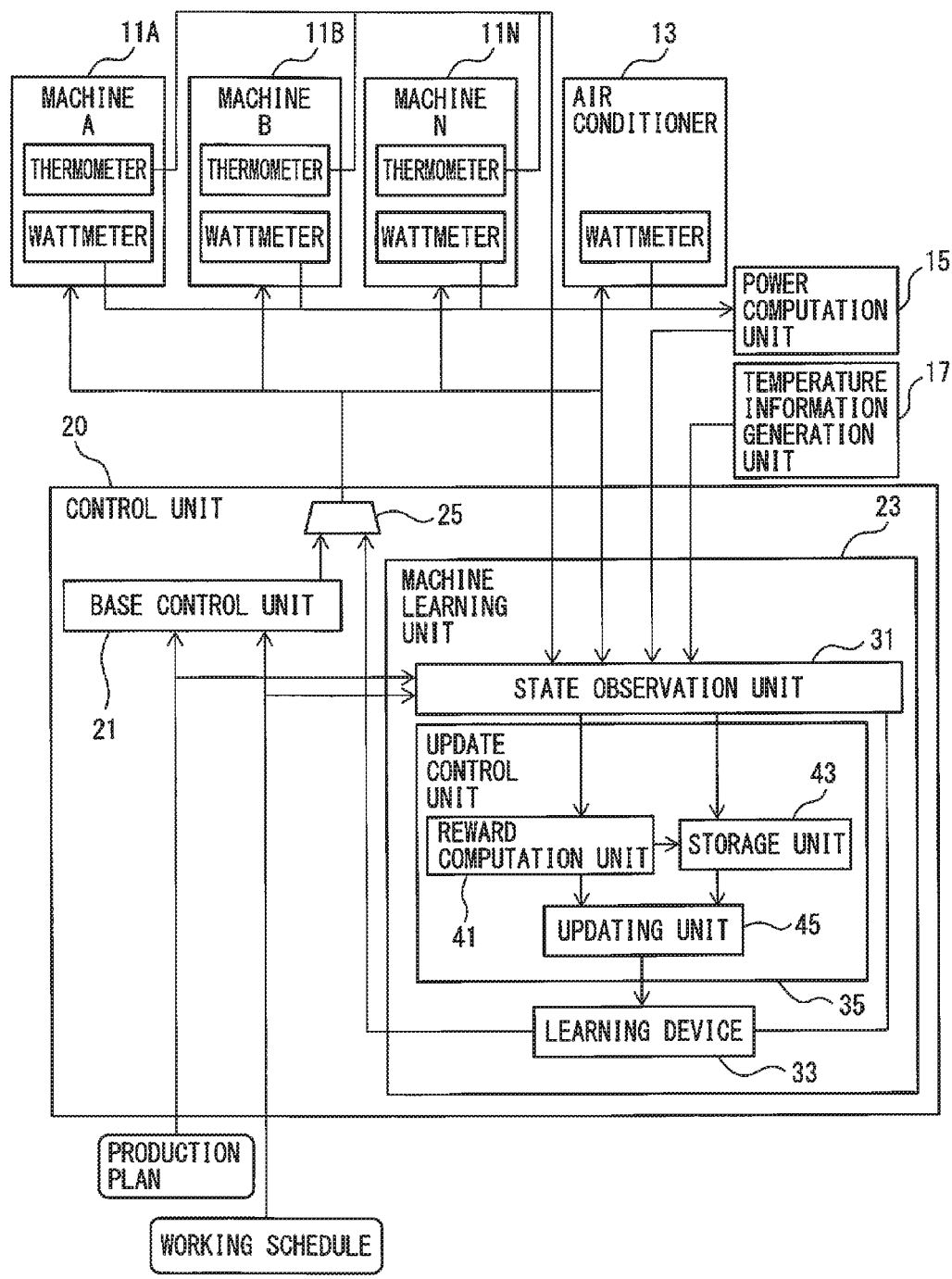

FIG. 8A

PRODUCTION PLAN

| PRODUCT | QUANTITY | REQUIRED PROCESS | DELIVERY DEADLINE |
|---|---|---|---|
| X | $N_X$ PIECE(S) | MACHINE A: $t_{AX}(P_A)$ HOUR(S)/PIECE<br>MACHINE B: $t_{BX}(P_B)$ HOUR(S)/PIECE<br>⋮<br>MACHINE N: $t_{NX}(P_N)$ HOUR(S)/PIECE | $t_X$ HOUR(S) |
| Y | $N_Y$ PIECE(S) | MACHINE A: $t_{AY}(P_A)$ HOUR(S)/PIECE<br>MACHINE B: $t_{BY}(P_B)$ HOUR(S)/PIECE<br>⋮<br>MACHINE N: $t_{NY}(P_N)$ HOUR(S)/PIECE | $t_Y$ HOUR(S) |
| Z | $N_Z$ PIECE(S) | MACHINE A: $t_{AZ}(P_A)$ HOUR(S)/PIECE<br>MACHINE B: $t_{BZ}(P_B)$ HOUR(S)/PIECE<br>⋮<br>MACHINE N: $t_{NZ}(P_N)$ HOUR(S)/PIECE | $t_Z$ HOUR(S) |

FIG. 8B

WORKING SCHEDULE

| MACHINE | OPERABLE/INOPERABLE |
|---|---|
| A | $e_A(t)$ |
| B | $e_B(t)$ |
| ⋮ | ⋮ |
| N | $e_N(t)$ |

PRODUCTION CONTROL SYSTEM AND INTEGRATED PRODUCTION CONTROL SYSTEM

RELATED APPLICATIONS

The present application claims priority to Japanese Patent Application No. 2016-022598 filed Feb. 9, 2016, the disclosure of which is hereby incorporated by reference herein in its entirety.

BACKGROUND OF THE INVENTION

1. Field of the Invention

The present invention relates to production control systems and integrated production control systems and in particular relates to a production control system and an integrated production control system that learn to minimize power consumption for production in a factory with a plurality of machines and an air conditioner, while satisfying temperature requirements inside the factory and product delivery deadlines.

2. Description of the Related Art

Factories are commonly equipped with a plurality of machines (e.g., machine tools) and, in the case of high precision processing, air conditioning (an air conditioner) is provided so as to control environmental conditions inside the factory because the temperature in the factory affects processing accuracy. Production at a factory is dictated by a production plan, and, to produce the products dictated by the production plan within a dictated delivery deadline, the running status and processing conditions of a plurality of machines are controlled, and the running status of the air conditioner is also controlled so as to achieve temperature conditions (temperature and uniformity) inside the factory required for the processing.

The time for proceeding from one processing step to the next in a production process of a product is called takt time, which is an index extensively used in production management. Note that takt time is sometimes used in other meanings but used herein in the meaning of the above-described time. For example, when Nx pieces of a product having a takt time of $t_{XMAX}$ are produced, the production time for the Nx pieces of the product, which is relevant to the delivery deadline, approximates $Nx \times t_{XMAX}$ where Nx is sufficiently great.

In conventional factory management, when a production plan is presented, the factory manager makes decisions on running status (starts and stops of operation) and processing conditions of a plurality of machines to produce the products dictated by the production plan by the dictated delivery deadline, and also makes decisions on running status of the air conditioner to achieve required temperature inside the factory, taking into consideration external temperature and temperature changes resulting from running the machines. Working schedule of factory workers is also taken into consideration where the staffing situations affect the range of operational machines.

Contracts between a factory and a power company have a provision on a maximum value of on-peak power supply, with a mandatory curtailment of power supply in the case of demand exceeding the maximum value, which may result in a power failure. In recent years, contracts with power companies also contain a provision that the factories should bring their on-peak power demands even below the maximal value during periods of increased power consumption e.g. during summer, and a violation of the provision may entail a penalty such as raised electricity rates. The difficulty in this case is that factory managers have to consider not only the power consumption in production lines but also power consumption of various factory appliances (e.g., power consumption of office equipment, power consumption of air conditioners in factory offices). The factory managers are responsible for avoiding such a situation and at the same time keeping delivery deadlines and ensuring product qualities. For this reason, conventionally, factory managers are chosen among skilled workers.

However, relying on a limited number of skilled workers for factory management accompanies a lot of risk. To address this, controlling apparatuses have been devised that automatically perform factory production management in accordance with a given production plan by executing factory management program developed on the basis of prevailing factory management experiences.

Japanese Unexamined Patent Publication (Kokai) No. 2011-156598 discloses a power consumption controlling system that includes power monitoring means for machine tools to be controlled and controls rotational acceleration/deceleration rates of the main and feed spindles so that the power consumption of the machine tool may be maintained at not more than a predetermined target value that is changed from time to time.

Japanese Patent Publication No. 5818865 discloses a system for achieving the levelling of power consumption, regarding a production line including a plurality of processes to be carried out by a plurality of line instruments, by making selection of process arrangement combinations based on float periods of processes obtained by the PERT analysis and power consumption per unit period, based on information on each of the processes, and thereby controlling progress of the processes as well as turning off unused line instruments. The above document also discloses that the system measures power consumption in real time, and when power consumption exceeds a predetermined target value, the rotational speed or rotational acceleration/deceleration rate of a motor is reduced.

However, there has been a problem of complicated work and large expenditure involved in developing a factory management program to be installed in an apparatus that performs automatic factory production management.

SUMMARY OF INVENTION

A purpose of the invention is to realize at a low cost a production control system for controlling production at a factory equipped with a plurality of machines and an air conditioner so as to reduce power consumption while observing restriction on temperature inside the factory and delivery deadlines of the products.

A production control system is a production control system of a factory, the system including: a plurality of machines; an air conditioner; a power computation unit for monitoring power consumption of an entire factory including power consumption of the plurality of machines and the air conditioner; and a temperature information generation unit for generating information on temperature inside the factory; wherein running status and processing condition of the plurality of machines and running status of the air conditioner are controlled so as to produce a product dictated by the production plan by a dictated delivery deadline; and a machine learning unit that learns a relationship of operational status, which includes the running status and processing condition of the plurality of machines and running status of the air conditioner, and environmental status, which includes production completion time of the product according to the operational status, the temperature inside the factory and the power consumption of the entire factory, and outputs the operational status that brings the environmental status to a desired condition in accordance with a production plan.

An integrated production control system includes a plurality of above-described production control systems respectively provided for a plurality of factories; and a communication network connecting the plurality of production control systems; wherein each of the production control systems transmits a result of learning by its machine learning unit to another production control system via the communication network, and the plurality of machine learning units of the plurality of production control systems share the results of learning.

BRIEF DESCRIPTION OF THE DRAWINGS

The present invention will be more clearly understood by referring to the following accompanying drawings:

FIGS. 6A and 6B respectively illustrate an exemplary representation of a production plan and a working schedule in the second embodiment;

FIG. 7 illustrates an arrangement of a factory equipped with a production control system of a third embodiment;

FIGS. 8A and 8B respectively illustrate an exemplary representation of a production plan and a working schedule in the third embodiment.

DETAILED DESCRIPTION

A production control system and an integrated production control system will be described below with reference to the drawings. It will be understood, however, that the present invention is not limited to the drawings or embodiments described below.

Figure 1:
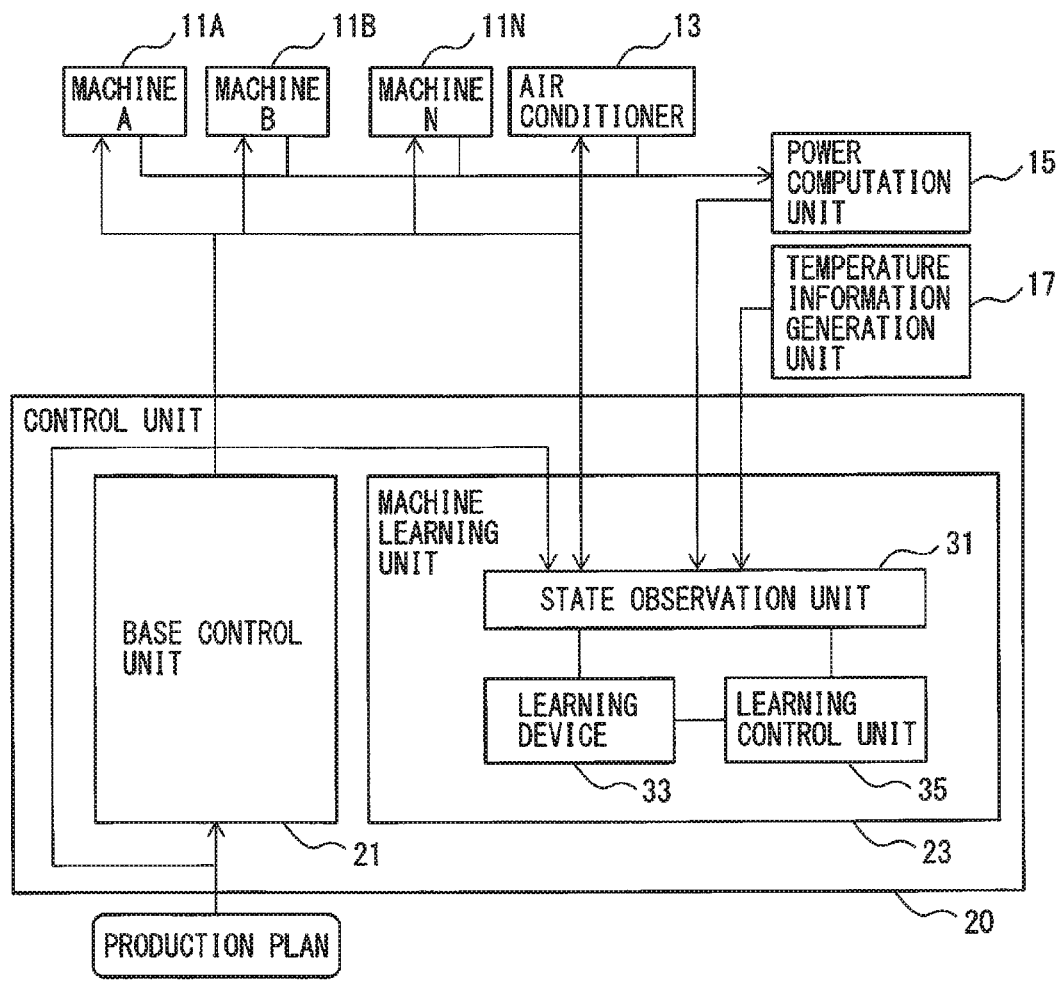
FIG. 1 illustrates an arrangement of a factory equipped with a production management system of a first embodiment.

FIG. 1 illustrates an arrangement of a factory equipped with a production management system of a first embodiment.

A factory includes a plurality of machines 11A to 11N, an air conditioner 13, a power computation unit 15, which monitors the total power consumption of the factory including power consumption of the plurality of machines 11A to 11N and of the air conditioner 13, and a temperature information generation unit 17, which generates information on temperature inside the factory, and a control unit 20 controls the factory. The control unit 20 is realized by a computer installed with software.

An air conditioner 13 is not necessarily a single air conditioner but may be a plurality of air conditioners. The control unit 20 may be provided for the factory on-site or provided away from the factory in communication with each section of the factory via a communication network. Note that, for the sake of simplicity, description herein will be made of a factory that includes the above-mentioned entities, which the control unit 20 controls. However, for example, the factory may include an office and an air conditioner for the office, the power computation unit 15 may compute power consumption including the power consumption of the air conditioner of the office, the temperature information generation unit 17 may output temperature information including the temperature information of the office, and the control unit 20 may also controls the air conditioner of the office. Further, machines may include machines not directly involved in machining processes, such as lighting and conveying equipment. In this case, the machines not directly involved in the machining processes do not contain control items concerning processing conditions such as processing speed.

The control unit 20 controls running status and processing conditions of the plurality of machines 11A to 11N and controls running status (e.g., running period and output) of the air conditioner 13 so that the products dictated by a production plan presented from outside will be produced by the dictated delivery deadlines. The production plan contains, for example, items to be produced each day, volume, delivery deadlines (production completion time), and the like.

The control unit 20 includes a base control unit 21 and a machine learning unit 23. The base control unit 21 includes input means for inputting data concerning running status and processing conditions of the plurality of machines 11A to 11N and the running status (e.g., running period and output) of the air conditioner 13, which skilled workers prepared in accordance with the production plan, taking various factors into consideration. The input means is realized by, for example, a data input port connected to a control data input unit of the plurality of machines 11A to 11N and the air conditioner 13, or a computer or the like having a data input function with display. Data concerning running status and processing conditions of the plurality of machines 11A to 11N is expressed as a chronological presentation of the products to be processed by each machine and speeds for processing the products. For example, data is expressed as a sequential display of kinds of products, times of start and end of processing, and processing conditions. By dividing a day by a unit time, for example, dividing by 10 minutes the eight hours from eight o'clock to twelve o'clock and thirteen o'clock to seventeen o'clock into 48 units, data may also be expressed by specifying, for each unit time, kinds of products to be processed and processing conditions. If the processing time is 30 minutes, the processing takes 3 units. Note that herein processing time includes time for setting a material to be processed on the machine and removing the finished product. Processing conditions include, for example, processing speed, and indicate in stages ranges of speed that will allow processing at desired precision. Processing time is in reverse proportion to processing speed. Data concerning running status (e.g., running period and power) of the air conditioner 13 is expressed in a similar manner.

While the machine learning unit 23 has not yet performed sufficient amount of learning, the plurality of machines 11A to 11N and the air conditioner 13 are fed with control data inputted in the base control unit 21 concerning the plurality of machines 11A to 11N and the air conditioner 13. The plurality of machines 11A to 11N and the air conditioner 13 operate in accordance with the control data. For example, a machine A processes a product X for a processing time S (at a processing speed R), repeats the process 10 times (to produce 10 pieces of the product X), then suspends the running for 20 minutes, and after that repeats the same operation three times. This produces a total of 30 pieces of the product X.

Operation of the plurality of machines 11A to 11N and the air conditioner 13 in accordance with the control data consumes electric power, generates heat and changes temperature in the factory. The power computation unit 15 computes the total power consumption of the plurality of machines 11A to 11N and the air conditioner 13 by, for example, reading outputs of power meters respectively provided for the plurality of machines 11A to 11N and the air conditioner 13. Alternatively, the power computation unit 15 may compute the total power consumption by reading the processing conditions of the plurality of machines 11A to 11N and the control data of the air conditioner 13 since the processing conditions of the plurality of machines 11A to 11N are in a fixed relation to the power consumption of these machines and the output of the air conditioner 13 is in a fixed relation to the power consumption of the air conditioner.

The temperature information generation unit 17 generates temperature information by detecting temperature in the factory. The number of sites where temperature is detected is not limited to one but may be more than one, but herein, the temperature information is taken to include one temperature. For example, in the case where the temperature during the processing is preferred to be not lower than T ° C. and not higher than U ° C., the lowest of the temperatures detected in a plurality of sites is selected for inclusion in the temperature information when the temperatures are low, and the highest of the temperatures detected in a plurality of sites is selected for inclusion in the temperature information when the temperatures are high. However, selection of a temperature is not limited to this manner and an average of temperatures detected in a plurality of sites may be selected for inclusion in the temperature information. Further, depending on the configuration of the machine learning unit 23, temperature information may contain a plurality of temperatures. Furthermore, temperature detection is not limited to the sites inside the factory but outdoor temperature may be detected. Furthermore, prediction data concerning outdoor temperature changes may be collected from an external source.

The machine learning unit 23 includes a state observation unit 31, a learning device 33, and a learning control unit 35. The state observation unit 31 obtains data on the production plan, control data respectively provided for the plurality of machines 11A to 11N and the air conditioner 13, the total power consumption at predetermined times of the day (on-peak power) received from the power computation unit 15, and temperature information received from the temperature information generation unit 17, as state variables at every unit time.

The learning device 33 performs learning based on the state variables obtained by the state observation unit 31, and after performing sufficient amount of learning, outputs control data provided for each of the plurality of machines 11A to 11N and the air conditioner 13 in accordance with the data on the production plan. At this time, the learning device 33 may externally output on-peak power prediction made in accordance with the outputted control data together with temperature information, and may further separately compute and externally output takt time, production completion time (delivery time) and the like, which it can compute in accordance with the control data.

The learning control unit 35 includes a reward computation unit, which computes rewards, which indicate degrees of desirability of production operations executed in the factory in accordance with the control data, a storage unit, which store state variables obtained by the state observation unit 31 and sets of rewards, and the learning control unit 35 which controls learning performed by the learning device 33 on the basis of the state variables and the sets of rewards.

Description of learning algorithms for the machine learning unit 23 will be made later; description of learning processing procedure will be made first.

Figure 2:
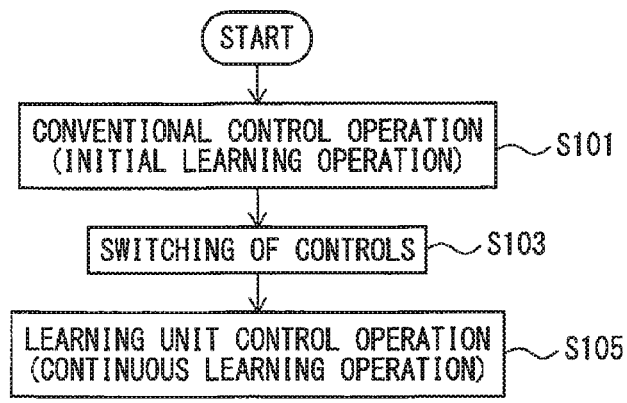
FIG. 2 is a flowchart illustrating basic processing operation of the production management system of the first embodiment.

FIG. 2 is a flowchart illustrating basic processing operation of the production management system of the first embodiment.

The production management system of the first embodiment controls running status and processing conditions of the plurality of machines 11A to 11N and the running status (e.g., running period and output) of the air conditioner 13 in the factory and it is not practical to run the factory solely for allowing the machine learning unit 23 to learn. Thus, as before, a skilled worker determines the control data, and in Step S101 the factory is run based on the control data. This is herein referred to as conventional control operation. By conducting conventional control operation, a set including control data, production completion time (time from the start to the completion of a production), data on changes in on-peak power, data on changes in temperature information is obtained for each working day. In the first embodiment, the rewards are defined in a manner that, on the condition that the delivery deadline is met and temperature conditions for processing is satisfied, a greater reward is given for a smaller maximum value of on-peak power consumption on the operation day, and such rewards are stored in association with respective sets.

Learning data may be obtained by a computer simulation if the simulation, using as variables sets of data including the production plan, running status and processing conditions of the plurality of machines 11A to 11N and running status (e.g., running period and power) of the air conditioner 13, can present high precision results for production completion time (time from the start to the completion of production), data of changes in on-peak power, data on changes in temperature information, corresponding to the control data variables. In this case, a lot of learning data can be obtained from simulations by appropriately (e.g., randomly) altering elements of data sets used as variables.

In Step S101, conventional control operations are repeated for sufficient number of days for accumulating the amount of data necessary for learning by the machine learning unit 23. The number of repetition (working days) is determined as appropriate on the basis of past experience. As this operation is an operation of the machine learning unit 23 accumulating data for performing learning, the operation is herein also referred to as the initial learning operation.

At the final stage of the conventional control operation (initial learning operation), the learning control unit 35 has sufficient amount of data for performing learning, and the learning device 33 performs learning based on the accumulated data. After a successful learning the learning device 33 can output a set of control data predicted to receive good rewards in light of the production plan. A process of checking the appropriateness of the output of the learning device 33 may be added if necessary.

In Step S103, the control unit 20 switches control data outputs from the output of the base control unit 21 to the output of machine learning unit 23 in supplying running status and processing conditions for the plurality of machines 11A to 11N and running status (e.g., running period and output) for the air conditioner 13.

In Step S105, running status and processing conditions outputted to the plurality of machines 11A to 11N and running status (e.g., running period and output) outputted to the air conditioner 13 are controlled with control data outputted by the machine learning unit 23. This control is herein referred to as learning unit control operation. Hereafter in Step S103 learning unit control operations are repeated.

In Step S103, when learning unit control operations are repeated, new data usable for learning will be obtained. Hence, in the first embodiment the learning device 33 from time to time performs learning based on the learning unit control operations newly performed in Step S103 and results thereof (production completion time, data on on-peak power changes, and data on changes in temperature information) to conduct an even better control. This learning operation is herein referred to as continuous learning operation. A continuous learning operation may be conducted every time when a new learning unit control operation is conducted or when a predetermined number of learning unit control operations have been conducted.

The machine learning unit 23 may use any learning algorithm. The machine learning unit 23 has functions of analytically extracting, from a set of data inputted to the apparatus, a useful rule, a knowledge representation, a criterion for judgment or the like contained in the set of data, outputting a result of the judgment, and performing knowledge learning. There are various techniques for this but herein "reinforcement learning" and "supervised learning" are used. For example, "supervised learning" is used for conventional control operations (initial learning operations) in Step S101 and "reinforcement learning" is used in learning unit control operations (continuous learning operations) in Step S103. At the beginning of Step S103, the learning device 33 is at the state in which "supervised learning" is completed, which is the initial state of "reinforcement learning".

In realizing the above techniques there is a technique called "deep learning", in which extraction of a feature value is learnt. These machine learning techniques (the learning device 33) are realized by, for example, applying e.g. GPGPU (General-Purpose Computing on Graphics Processing Units) or a large-scale PC cluster.

Next, the learning device 33 will be described more in detail. The learning device 33 has functions of analytically extracting, from a set of inputted data, a useful rule, a knowledge representation, a criterion for judgment or the like contained in the set of data, outputting a result of the judgment, and performing knowledge learning. As described above, algorithms for the learning device 33 include "supervised learning" and "reinforcement learning".

"Reinforcement learning" has the following elements.

The machine learning unit 23 of the control apparatus 20 observes operation state and environment state.

Environment changes depending on operations.

Data on actual on-peak power changes is observed in relation to the observed environment (state variable) and a label (reward) is obtained.

The neural network (the function) is updated so that a label with a higher score can be obtained in relation to the production plan.

Learning starts from a state in which the machine learning unit 23 has no or incomplete knowledge of outcomes (on-peak power) that the environment (state variable) brings about. In other words, rewards can be obtained as data only after the plurality of machines (control apparatuses) 11A to 11N and the air conditioner 13 are actually set in operation. Hence, an optimum function and control data for maximizing rewards are obtained through trial and error.

Learning may be started from a good starting point by providing an initial state in which imitating human operation is learnt by prior learning.

Herein, "reinforcement learning" is a method for learning an appropriate action in view of the interactions between actions and environment affected by the actions, by learning not only determination and classification but also actions, i.e., a method for learning to maximize rewards to be obtained in the future. This indicates that actions can be learnt that bring about an effect on the future, for example, accurate calculation of a maximum value of on-peak power, in the present embodiment. Description will be continued taking Q-learning as an example, but the present embodiment is not limited thereto.

Q-learning is a method for learning a value Q(s, a) that selects an action a in an environmental state s. In other words, an action a that gives a highest value Q(s, a) is selected as an optimum action. In the beginning, however, the correct value of Q(s, a) is completely unknown for any combination of a state s and an action a. Accordingly, the agent (the subject of actions) selects various actions a in the state s and is given a reward for each action a taken. By so doing, the agent learns to select a better action, i.e., a correct value Q(s, a).

Further, it is desired to maximize the total sum of the rewards to be obtained in the future, and hence to obtain Q(s, a)=E[Σγ$^t$r$_t$]. Here, E[ ] represents an expected value, t is time, γ is a parameter called discount rate, which will be described later, r$_t$ is the reward at time t, Σ is the summation over time t. The expected value in this equation is taken for the case when the state has changed in accordance with the optimum action, and, since the optimum action is not known, learning is performed while searching for an optimum action. A formula for updating such a value Q(s, a) can, for example, be given by the expression (1).

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In the expression (1), $s_t$ is a state of environment at time t, $a_t$ is an action taken at time t. The action $a_t$ changes the state to $s_{t+1}$. $r_{t+1}$ represents the reward given for the change of the state. The term with max attached to is the Q-value multiplied by γ when an action a known at the time to give the highest Q-value in the state $s_{t+1}$ is selected. γ is a parameter called discount rate, satisfying 0<γ≤1. α is a learning factor, satisfying 0<α≤1.

The expression (1) represents a method for updating the evaluation value $Q(s_t, a_t)$ of an action $a_t$ in a state $s_t$, based on the reward $r_{t+1}$ returned as a result of the trial $a_t$. $Q(s_t, a_t)$ is increased when the sum of the reward $r_{t+1}$ and the evaluation value $Q(s_{t+1}, \max a_{t+1})$ of the best action max a in the state subsequent to the state s and resulting from the action a is greater than the evaluation value $Q(s_t, a_t)$ of the action a in the state s; $Q(s_t, a_t)$ is decreased when the afore-mentioned sum is smaller than $Q(s_t, a_t)$. In other words, the value of a particular action in a particular state is brought close to the reward immediately returned as a result and the value of the best action in the subsequent state resulting from the particular action.

Methods for representing Q (s, a) on a computer include a method in which values are provided for all state-action pairs (s, a) in the form of a table (action value table) and a method in which a function is provided for approximating Q(s, a). With the latter method, the above-mentioned updating expression (1) can be implemented by adjusting the parameter of the approximation function using a technique such as the stochastic gradient descent method. A neural network, which will be described later, can be used as the approximation function.

Figure 3:
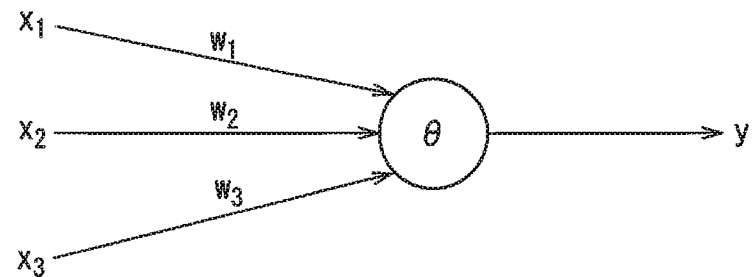
FIG. 3 is a schematic diagram illustrating a model of a neuron.

A neural network can also be used as an approximation algorithm for a value function in supervised learning, unsupervised learning or reinforcement learning. A neural network is constituted by an arithmetic device, a memory and other devices for implementing a neural network in imitation of a model of a neuron, for example, as illustrated in FIG. 3. FIG. 3 is a schematic diagram illustrating a model of a neuron.

As illustrated in FIG. 3, a neuron serves to produce an output y for a plurality of inputs x (FIG. 3 illustrates inputs x1 to x3 as an example). Each input x1 to x3 is multiplied by a weight w (w1 to w3) corresponding to the input x. The neurons thereby produce output y expressed by the equation (2). Note that all of the input x, the result y, and the weight w are vectors. In the equation (2) below, θ is a bias and $f_k$ is an activation function.

$$y = f_k(\Sigma_{i=1}^{n} x_i w_i - \theta) \quad (2)$$

Figure 4:
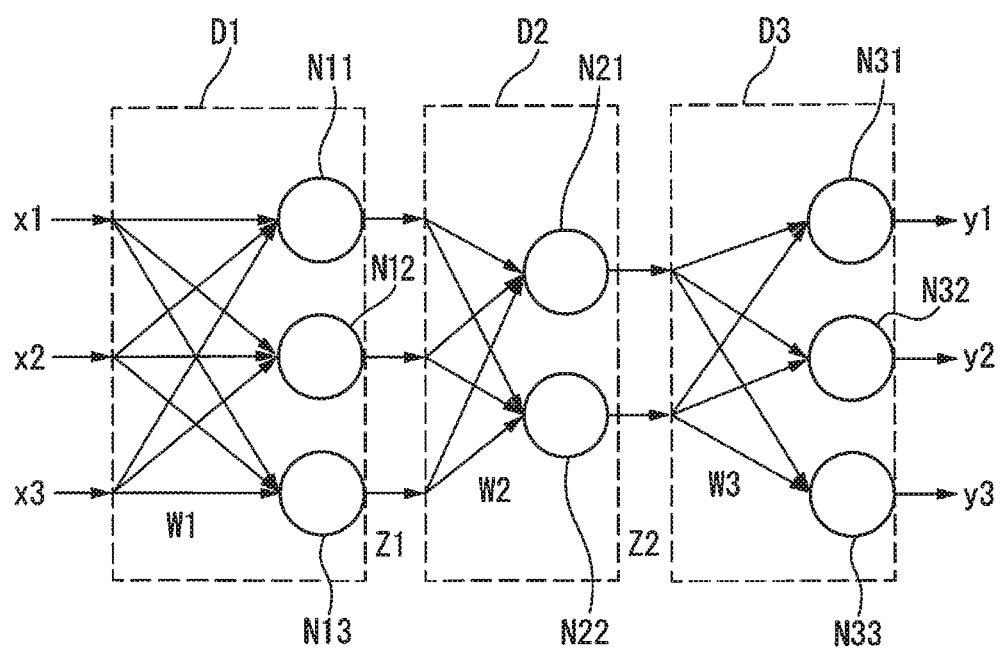
FIG. 4 is a schematic diagram illustrating a neural network having weights of three layers D1 to D3.

A three-layer neural network formed by combining the above-described neurons will be described below with reference to FIG. 4. FIG. 4 is a schematic diagram illustrating a neural network having weights of three layers D1 to D3.

As illustrated in FIG. 4, a plurality of inputs x (inputs x1 to x3 are taken as an example herein) are inputted from the left of the neural network and results y (results y1 to y3 are taken as an example herein) are outputted from the right of the network.

More specifically, the inputs x1 to x3 are multiplied by a corresponding weight before being inputted to each of three neurons N11 to N13. The weights used to multiply these inputs are collectively referred to as W1.

The neurons N11 to N13 output z11 to z13, respectively. In FIG. 4, z11 to z13 are collectively referred to as feature vectors Z1 and may be regarded as vectors obtained by extracting features of input vectors. The feature vectors Z1 are feature vectors between the weights W1 and W2. Z11 to z13 are multiplied by a corresponding weight before being inputted to each of two neurons N21 and N22. The weights used to multiply these feature vectors are collectively referred to as W2.

The neurons N21 and N22 output z21 and z22, respectively. In FIG. 4, z21 and z22 are collectively referred to as feature vectors Z2. The feature vectors Z2 are feature vectors between the weights W2 and W3. Z21 and z22 are multiplied by a corresponding weight before being inputted to each of three neurons N31 to N33. The weights used to multiply these feature vectors are collectively referred to as W3.

Lastly, the neurons N31 to N33 output results y1 to y3, respectively.

The operation of the neural network includes a learning mode and a value prediction mode. For example, weights w are learned using a learning data set in the learning mode, and the parameter is used in the prediction mode for determining actions concerning the control of the plurality of machines and the air conditioner. Here, reference has been made to "prediction" only for the sake of convenience and, needless to say, a variety of tasks such as detection, classification, and inference may be performed.

Data obtained by actually running the plurality of machines and the air conditioner in the prediction mode may immediately be learned and reflected on the subsequent action (online learning), or a group of data collected in advance may be used to perform one-off learning and to subsequently perform in a detection mode using the same parameters (batch learning). As an intermediate approach, the learning mode can be interposed every time a certain amount of data has been accumulated.

The weights W1 to W3 can be learned by the error backpropagation method. Error Information enters from the right and flows to the left. The error backpropagation method is a technique for adjusting (learning) weights for each neuron to reduce the difference between the output y corresponding to the input x and the true output y (teacher).

A neural network as described above can have more than three layers (for deep learning). It is possible to automatically acquire from teacher data alone an arithmetic device which extracts features of the input stepwise and returns a result.

Similarly to "reinforcement learning", "supervised learning" can be implemented by using an algorithm of a neural network, and the neural network (a function) is updated in accordance with teacher data every time a state observation is conducted. The above-described labels (rewards) can be used as the teacher data.

The production control system of the first embodiment has so far been described, and a second embodiment will be described next, with concrete examples of the control data.

Figure 5:
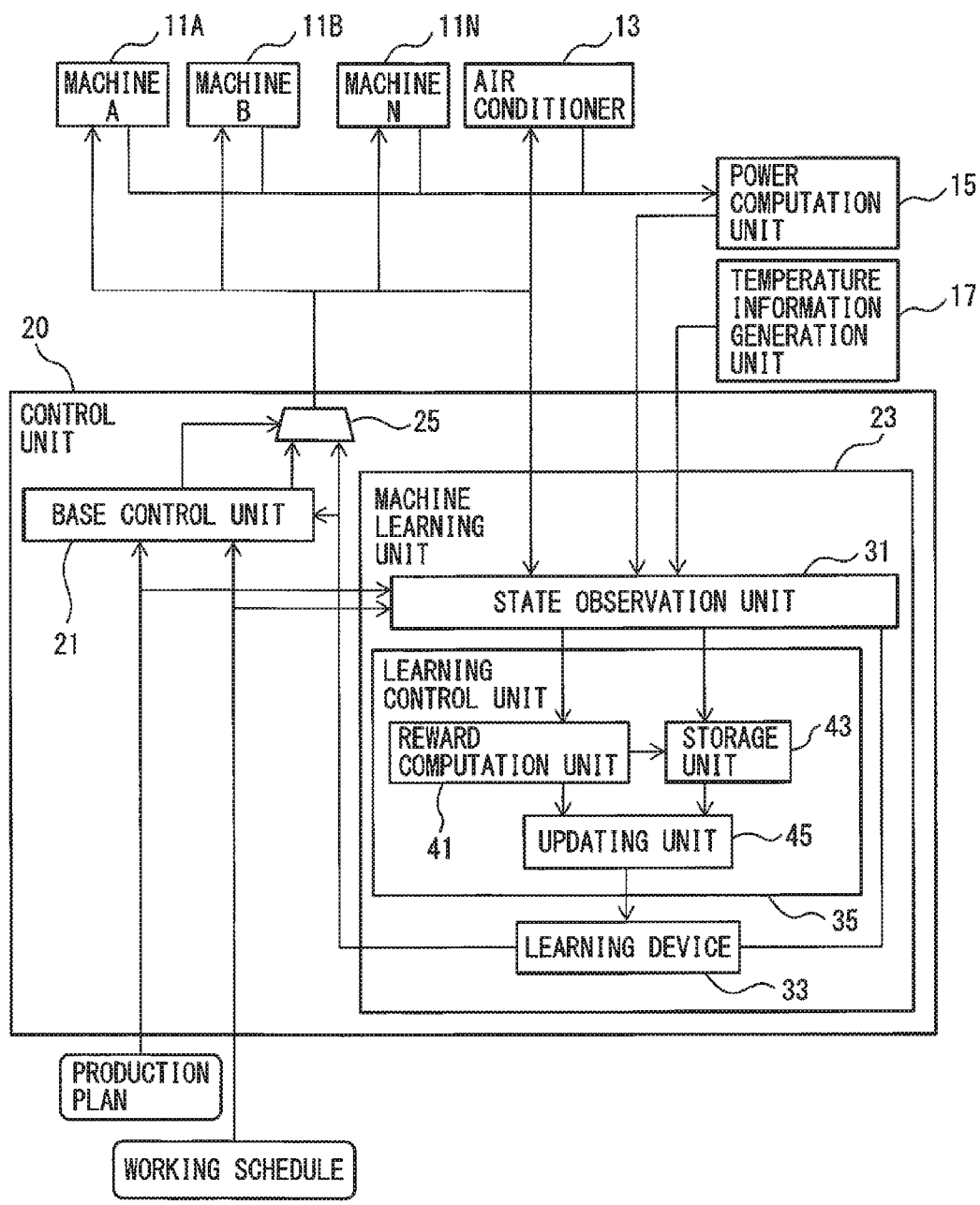
FIG. 5 illustrates an arrangement of a factory equipped with a production control system of a second embodiment.

FIG. 5 illustrates an arrangement of a factory equipped with a production control system of the second embodiment.

Similar to the factory in the first embodiment, the factory in the second embodiment includes a plurality of machines 11A to 11N, an air conditioner 13, a power computation unit 15, and a temperature information generation unit 17, and a control unit 20 controls the factory. The control unit 20 includes a base control unit 21 and a machine learning unit 23 as well as a switch 25, and performs control based on a production plan and a working schedule provided from outside. The switch is a device for switching the control in Step S103 in FIG. 2, and implemented by software as described above.

FIGS. 6A and 6B respectively illustrate an exemplary representation of a production plan and a working schedule in the second embodiment. The working schedule provides information on the workers who come to work at the factory and engage themselves in production, and affects the range of operable machines. For example, when a sufficient number of workers are available according to the working schedule, all the machines 11A to 11N are operable at all times, but when only a limited number of workers are available according to the working schedule, running status of the machines is restricted, for example, one of the machines may be inoperable all day, or two of the machines cannot be operated at the same time. For the sake of simpler description, herein, operability of the machines is presented by indicating each machine being operable or inoperable. However, the information can be presented by not only by indicating each machine being operable or inoperable but also by indicating changes in combinations of concurrently operable machines.

Similarly to the first embodiment, the machine learning unit 23 includes a state observation unit 31, a learning device 33, and a learning control unit 35. The learning control unit 35 includes a reward computation unit 41, a storage unit 43, and an updating unit 45, as illustrated. The learning device 33 may use any of the above-described algorithms. The second embodiment will be described in detail with examples of data provided for each unit.

As illustrated in FIG. 6A, the production plan includes entries for kind of products, number of products, process for producing one product, and delivery deadline, and represents herein the production of $n_X$ pieces of one kind of product X with a delivery deadline $t_X$, each piece of the product X to be processed with a machine A for $t_{AX}(P_A(t))$ hour(s), with a machine B for $t_{BX}(P_B(t))$ hour(s), . . . and with a machine N for $t_{NX}(P_N(t))$ hour(s). $P_A(t)$, $P_B(t)$, . . . , $P_N(t)$ are parameters of processing speed of the machines A, B, . . . , N, and $P_{KMIN}(t)<P_K(t)<P_{KMAX}(t)$, wherein K=A, B, . . . , N.

As illustrated in FIG. 6 B, the working schedule is provided in the form of data indicating operability of each machine.

The following input data is provided for the base control unit 21:
Production plan: FIG. 6A,
Working schedule: FIG. 6B,
Function for obtaining cycle time: $t_{AX0}(P_A(t))$, $t_{BX0}(P_B(t))$, . . . , $t_{NX0}(P_N(t))$, and
Function for obtaining power consumption: $p_{A0}(P_A(t))$, $P_{B0}(P_B(t))$, . . . , $P_{N0}(P_N(t))$, $P_{AIR0}(P_{AIR}(t))$,
wherein $t_{AX0}(P_A(t))$ is a function for obtaining the cycle time of the machine A, and likewise for the other similar terms, $p_{A0}(P_A(t))$ is a function for obtaining the power consumption of the machine A, $P_{AIR0}(P_{AIR}(t))$ is a function for obtaining the power consumption of the air conditioner, and likewise for the other similar terms.

The following input data are provided for the state observation unit 31 of the machine learning unit 23:
Production plan: FIG. 6A,
Working schedule: FIG. 6B,
Power consumption in the factory (from the power computation unit 15): $p_{TOTAL}(t)$, and
Information on the temperature inside the factory (and from the temperature information generation unit 17): $T_{AIR}(t)$.
In addition to the above, the output from the base control unit 21 to the machines A to N and the air conditioner, or the output from the learning device 33 is inputted.

The machine learning unit 31 is provided with the following inputs in advance:
Function for obtaining cycle time: $t_{AX0}(P_A(t))$, $t_{BX0}(P_B(t))$, . . . , $t_{NX0}(P_N(t))$,
Data for defining temperature range: $T_{MIN}$, $T_{MAX}$,
Processing speed parameter ranges (the upper and lower limits): $P_{AMIN}$, $P_{AMAX}$, $P_{BMIN}$, $P_{BMAX}$, . . . , $P_{NMIN}$, $P_{NMAX}$, and
Air conditioner control command range (the upper and lower limits): $P_{AIRMIN}$, $P_{AIRMAX}$.

The learning device 33 outputs the following:
Processing speed parameter: $P_A(t)$, $P_B(t)$, . . . , $P_N(t)$, wherein $P_{KMIN}<P_K(t)<P_{KMAX}$, and K=A, B, . . . , N, and
Air conditioner control command: $P_{AIR}(t)$, wherein $P_{AIRMIN}<P_{AIR}(t)<P_{AIRMAX}$.

The time of production completion of the product X is represented by $t_{XEND}$.

The learning device makes a search giving priority to the satisfaction of the conditions (1) and (2) below:

$$t_{XEND} < t_X \qquad (1), \text{ and}$$

$$T_{MIN} < T_{AIR}(t) < T_{MAX} \qquad (2).$$

Furthermore, the learning device performs learning so that the daily maximum value of $p_{TOTAL}(t)$ can be reduced while satisfying the conditions (1) and (2).

An example of a process in which a skilled worker determines the outputs will now be described.

First, by assuming a sufficiently large $N_X$, the production completion time of the product X $t_{XEND}$ approximates the takt time $t_{XMAX}$, and therefore the ranges of $P_A(t)$, $P_B(t)$, . . . , $P_N(t)$ are determined by the following equation:

$$t_{XEND} = t_{XMAX} N_X = \max\{t_{AX0}(P_A(t)), t_{BX0}(P_B(t)), \ldots, t_{NX0}(P_N(t))\} \cdot N_X.$$

Further, the following equation stands, and $P_{AIR}(t)$ for $T_{AIR}(t)$ can be determined by predicting $f_{AIR}(P_{AIR})$, wherein $f_{AIR}(P_{AIR})$ represents the temperature change resulting from the air conditioning and $T_O(t)$ is the temperature change resulting from other factors than the air conditioning, such as external air and heat sources.

$$T_{AIR}(t) = T_{AIR}(t-\Delta t) + f_{AIR}(P_{AIR}(t-\Delta t)) + T_O(t-\Delta t)$$

The power consumption in the factory $p_{TOTAL}(t)$ is predicted by the following equation, and $P_A(t)$, $P_B(t)$, . . . , $P_N(t)$ that are expected to minimize the daily maximum value of $p_{TOTAL}(t)$ can be determined, wherein $p_O(t)$ is the power consumption in the factory excluding the consumption of the machines A, B, . . . , N and the air conditioner. In this case, $p_O(t)$ is assumed to be a constant or predicted by observation.

$$p_{TOTAL}(t) = \sum_{K}^{A \sim N} p_{K0}(P_K(t)) + p_{AIR0}(P_{AIR}(t)) + p_O(t)$$

When parameters are decided by a human, accuracy of predictions for approximation error of $t_{XEND}$ and functions such as $p_O(t)$, $f_{AIR}(P_{AIR})$, and $T_O(t)$ can be improved by repeating the production process and observing actual values.

The process of determining output in the second embodiment will be described. The initial control is performed by the base control unit 21. The input into the machine learning unit 23 will be the teacher in "supervised learning"

The reward computation unit 41 computes rewards by the following rules:
when at least one of the condition (1) and the condition (2) fails to be satisfied, a negative value is given as reward, and
when both of the condition (1) and the condition (2) are satisfied, a positive value is given as reward for a change toward a decrease in the daily maximum value of $p_{TOTAL}(t)$, and a negative value is given as reward for a change toward an increase in the daily maximum value of $P_{TOTAL}(t)$.

The storage unit 43 stores sets of an input, a reward, and an output.

The updating unit 45 updates a model formula of the learning device 33 used for determining an output based on a set of an input, a reward, and an output.

After features have been learnt in "supervised learning", the operation control is switched from the control by the base control unit 21 to the control by the machine learning unit 23. The state of the learning device 33 at this time is defined as the initial state of the "reinforcement learning". The learning device 33 can update the model formula by "reinforcement learning". The updating unit 45 updates the model formula on the basis of the data in the storage unit 43.

FIG. 7 illustrates an arrangement of a factory equipped with a production control system of a third embodiment.

The factory in the third embodiment has a similar arrangement to that of the factory in the second embodiment but differs in that each of the plurality of machines 11A to 11N includes a thermometer and a power meter and that the air conditioner 13 includes a power meter. The control unit 20 of the third embodiment has a similar configuration to the control unit 20 of the second embodiment.

FIGS. 8A and 8B respectively illustrate an exemplary representation of a production plan and a working schedule in the third embodiment;

In the third embodiment, the machine learning unit 23 learns to generate control data that maintains a constant temperature for each machine and reduces the power consumption of the factory in the production of three kinds of products X, Y, and Z using the machines A, B, . . . , N in accordance with the production plan of FIG. 8A and the working schedule of FIG. 8B. Herein K=A, B, . . . , N and L=X, Y, Z.

As illustrated in FIG. 8A, the production plan (the production schedule) differs in that three kinds of products are produced, but the entry items for each product are the same as in the second embodiment. As illustrated in FIG. 8B, the working schedule is the same as in the second embodiment. The following inputs are provided for the base control unit 21:

Production plan: FIG. 8A,
Working schedule: FIG. 8B,
Function for obtaining cycle time: $t_{KL0}(P_K(t))$, and
Function for obtaining power consumption: $p_{K0}(P_K(t))$, $p_{AIR0}(P_{AIR}(t))$.

The following inputs are provided for the state observation unit 31 of the machine learning unit 23:

Production plan: FIG. 8A,
Working schedule: FIG. 8B,
Power consumption of each apparatus: $p_K(t)$, $p_{AIR}(t)$,
Power consumption in the factory: $p_{TOTAL}(t)$.
Temperature information of each apparatus: $T_K(t)$, $T_{AIR}(t)$, and
Information on the temperature inside the factory: $T_{AIR}(t)$.

The machine learning unit 23 is provided with the following inputs in advance:

Definition of temperature range: $T_{MIN}$, $T_{MAX}$,
Processing speed parameter range (the upper and lower limits): $P_{KLMIN}$, $P_{KLMAX}$, and
Air conditioner control command range: $P_{AIRMIN}$, $P_{AIRMAX}$.

The learning device outputs the following:

Running start/stop command: $E_{KL}(t)$, wherein $E_{KL}(t)=0, 1$,
Acceleration parameter: $P_K(t)$, wherein $P_{KMIN} < P_K(t) < P_{KMAX}$, and
Air conditioner control command: $P_{AIR}(t)$, wherein $P_{AIRMIN} < P_{AIR}(t) < P_{AIRMAX}$.

When $E_{KL}(t)=1$, the product L is processed with the machine K at the time t.

The time of production completion of the product L is represented by $t_{LEND}$.

The machine learning unit 23 makes a search with respect to all K and L giving priority to the satisfaction of the conditions (3) and (4) below.

$$t_{LEND} < t_L \quad (3)$$

$$T_{MIN} < T_K(t) < T_{MAX} \quad (4)$$

Furthermore, the machine learning unit 23 performs learning so that the daily maximum value of $p_{TOTAL}(t)$ can be reduced while satisfying the conditions (3) and (4).

An example of a process in which a skilled worker determines the outputs will now be described.

As a policy for the search, the first priority is to satisfy the production plan. The search is made over the ranges of running start/stop command and processing speed parameter that satisfy $t_{LEND} < t_L$. In so doing, if each machine cannot process more than one product, the following equation is satisfied as to all machines.

$$\sum_{L}^{X \sim Z} E_{KL}(t) \leq e_K(t)$$

An air conditioner control command satisfying the temperature condition for each point within the ranges will be computed. First, let the temperature change resulting from the air conditioning be $f_{AIR}(P_{AIR})$, and the temperature change resulting from the processing speed parameter $g_K(P_K(t))$. Let further the temperature change resulting from other factors than air conditioning, such as external air and heat sources, be $T_O(t)$, and it can be assumed that the following equations hold, by assuming constants $k_K$ and $l_K$.

$$t' = t \cdot \Delta t$$

$$T_{AIR}(t) = T_{AIR}(t') + \sum_{K}^{A \sim N} k_K(T_{AIR}(t') - T_K(t')) + T_O(t')$$

$$T_K(t) = T_K(t') + l_K(T_K(t') \cdot T_{AIR}(t')) + g_K(P_K(t'))$$

Alternatively, by observing the relationship between $T_{AIR}(t)$ and $T_K(t)$, the range of $T_{AIR}(t)$ is predicted and used.

By computing power consumption at each point where the production plan and temperature condition are satisfied, the output expected to minimize the daily maximum value of $p_{TOTAL}(t)$ can be determined. The following equation may be used if necessary, wherein $p_O(t)$ represents the power consumption in the factory excluding the power consumption of the machines A, B, . . . N and the air conditioner.

$$p_{TOTAL}(t) = \sum_{K}^{A \sim N} p_{K0}(P_K(t)) + p_{AIR0}(P_{AIR}(t)) + p_O(t)$$

However, when there is an error between the computed value and the actual time of production completion, temperature changes, or power consumption, it is necessary to correct the computation method or to compute again allowing for a margin.

The initial control is performed by the base control unit 21. The input into the machine learning unit 23 will be the teacher in "supervised learning"

The reward computation unit 41 computes rewards by the following rules:

when at least one of the condition (3) and the condition (4) fails to be satisfied for any of K and L, a negative value is given as reward, and when both of the condition (3) and the condition (4) are satisfied for all K and L, a positive value is given as reward for a change toward a decrease of the daily maximum value of $p_{TOTAL}(t)$, and a negative value is given as reward for a change toward an increase of the daily maximum value of $p_{TOTAL}(t)$.

After features have been learnt in "supervised learning", the operation control is switched from the control by the base control unit 21 to the control by the machine learning unit 23. The state of the learning device at the time is defined as the initial state of the "reinforcement learning". The learning device, when in an advanced state of learning, can update the model formula by "reinforcement learning".

Figure 9:
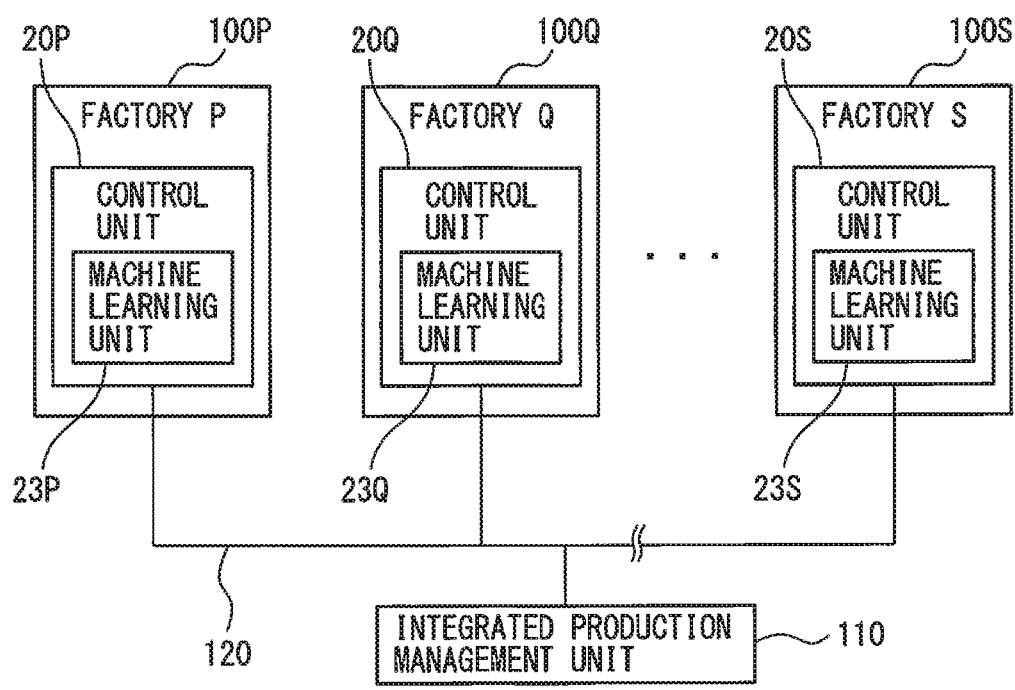
FIG. 9 illustrates an arrangement of a plurality of factories to which an integrated production control system of a fourth embodiment is applied.

FIG. 9 illustrates an arrangement of a plurality of factories to which an integrated production control system of a fourth embodiment is applied.

A plurality of factories 100P, 100Q, ..., 100S are respectively equipped with control units 20P, 20Q, ..., 20S according to one of the first, second and third embodiments. The control units 20P, 20Q, ..., 20S are communicably connected with one another via a communication network 120.

Further, as illustrated in FIG. 9, an integrated production management unit 110 is provided, which is mutually communicable with the control units 20P, 20Q, ..., 20S via the communication network 120. The integrated production management unit 110 integrates and manages the plurality of factories 100P, 100Q, ..., 100S. The integrated production management unit 110 generates production plans for the plurality of factories 100P, 100Q, ..., 100S and transmits the production plans so generated to the respective factories.

In an integrated production control system according to the fourth embodiment, the results of learning performed by the control unit 20I (I=P, Q, ..., S) of a factory are transmitted to the control unit 20J of another factory (J=P, Q, ..., S and J≠I). In other words, the control units 20P, 20Q, ..., 20S exchange and share results of learning via the communication network 120. When the control unit 20J has received learning results from the control unit 20I before the start of its own learning, it uses the learning results received as a reference for defining the initial state, and when it has received the results after performing its own learning, it compares its own learning results with the results it has received as a reference for further learning.

The production control system of the present invention realizes a production control system without creating a factory management program and thereby allows a cost reduction.

What is claimed is:

1. A production control system of a factory, the system comprising:
    a plurality of machines;
    an air conditioner;
    a power computation unit for monitoring power consumption of an entire factory, including power consumption of the plurality of machines and the air conditioner;
    a temperature information generation unit for generating information on temperature inside the factory,
    wherein running status and processing condition of the plurality of machines and running status of the air conditioner are controlled to produce a product dictated by a production plan by a dictated delivery deadline; and
    a machine learning unit that learns a relationship of operational status, which includes the running status and processing condition of the plurality of machines and running status of the air conditioner, and environmental status, which includes production completion time of the product according to the operational status, the temperature inside the factory and the power consumption of the entire factory, and outputs the operational status that brings the environmental status to a desired condition in accordance with a production plan, wherein
    the machine learning unit includes a state observation unit, a learning device and a learning control unit;
    the state observation unit obtains data on the production plan, control data provided for the plurality of machines and the air conditioner, the total power consumption received from the power computation unit, and temperature information received from the temperature information generation unit, as state variables;
    the learning device performs learning based on the state variables obtained by the state observation unit, and outputs control data provided for the plurality of machines and the air conditioner in accordance with the data on the production plan; and
    the learning control unit includes a reward computation unit, which computes rewards, which indicate degrees of desirability of production operations executed in the factory in accordance with the control data and a storage unit, which store state variables and sets of rewards, and the learning control unit controls learning performed by the learning device on the basis of the state variables and the sets of rewards.

2. The production control system according to claim 1, wherein the production plan includes a working schedule of workers, and running of the plurality of machines is restricted by a working schedule.

3. The production control system according to claim 1 that controls the running status and the processing condition of the plurality of machines and the running status of the air conditioner in accordance with the production plan and in accordance with a predetermined sequence until the machine learning unit reaches a state for outputting the operational status that brings the environmental status to a desired condition in accordance with the production plan.

4. The production control system according to claim 3, wherein the machine learning unit performs learning of the relationship of the operational status until a first predetermined number of controls in accordance with the predetermined sequence have been conducted.

5. The production control system according to claim 4, wherein the machine learning unit accumulates data on the operational status and the environmental status and performs learning based on the accumulated data until the first predetermined number of controls in accordance with the predetermined sequence have been conducted.

6. The production control system according to claim 1, wherein the control of the running status and the processing condition of the plurality of machines and the running status of the air conditioner is switched over to a control by output of the machine learning unit after the machine learning unit has performed learning.

7. The production control system according to claim 1, wherein the desired condition of the environmental status is considered more desirable when the production completion time and temperature inside the factory are within respective predetermined ranges and the power consumption of the entire factory is smaller.

8. An integrated production control system comprising:
    a plurality of production control systems according to claim 1 respectively provided for a plurality of factories; and
    a communication network connecting the plurality of production control systems, wherein each of the plurality of production control systems transmits a result of learning by a machine learning unit of the each production control system to another production control system via the communication network, and a plurality of the machine learning units of the plurality of production control systems share the results of learning.

* * * * *